No. 646,493. Patented Apr. 3, 1900.
H. GREEN.
HAY RAKE.
(Application filed Dec. 19, 1898.)
(No Model.) 3 Sheets—Sheet 1.
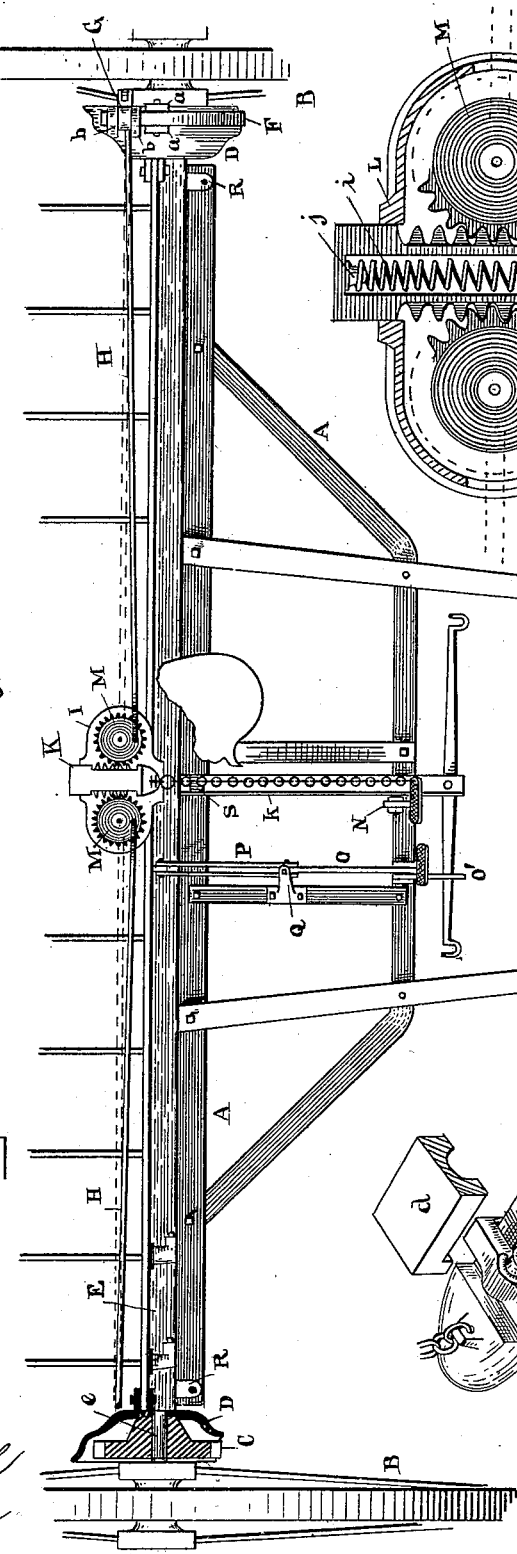
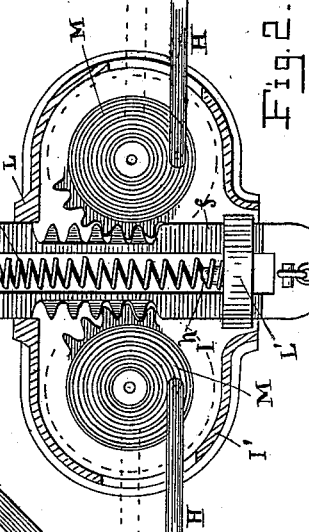
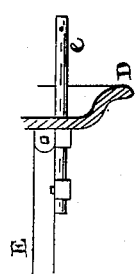
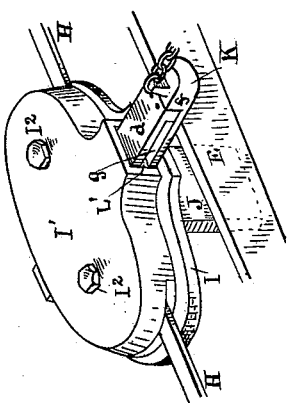
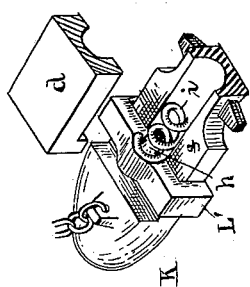
INVENTOR
Henry Green
By L. M. Thurlow,
ATTY.
WITNESSES
J. H. Busch
C. Johnson

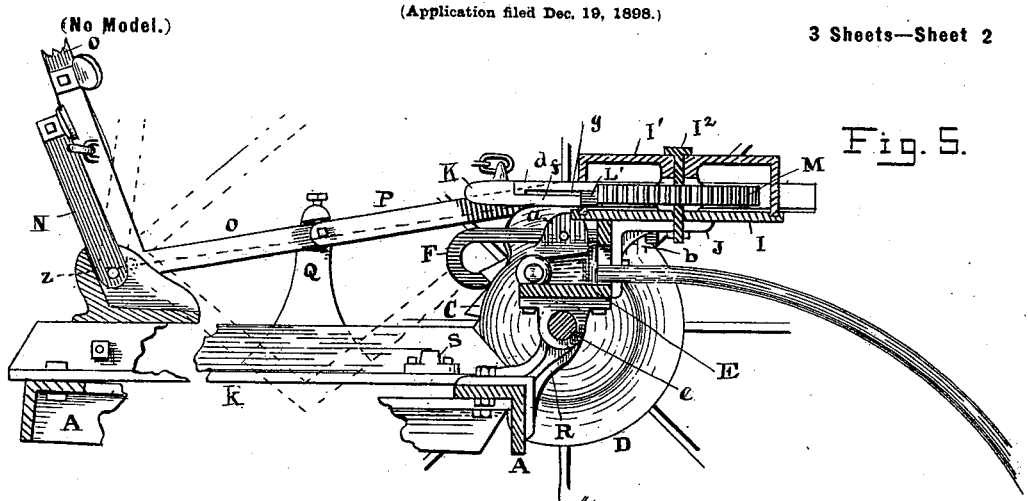
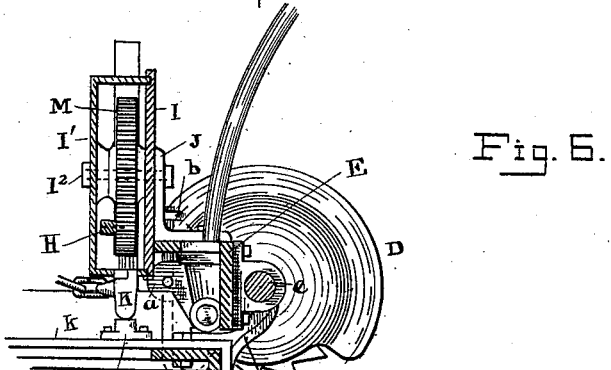
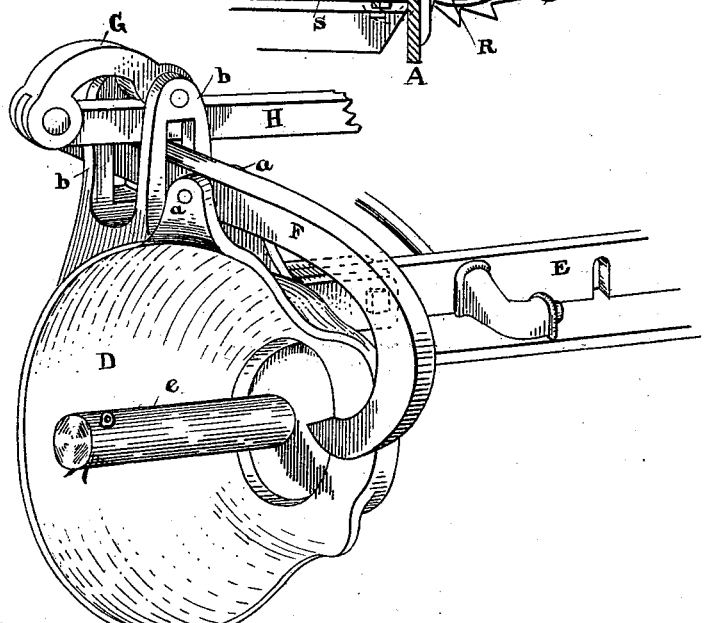

No. 646,493. Patented Apr. 3, 1900.
H. GREEN.
HAY RAKE.
(Application filed Dec. 19, 1898.)
(No Model.) 3 Sheets—Sheet 3.
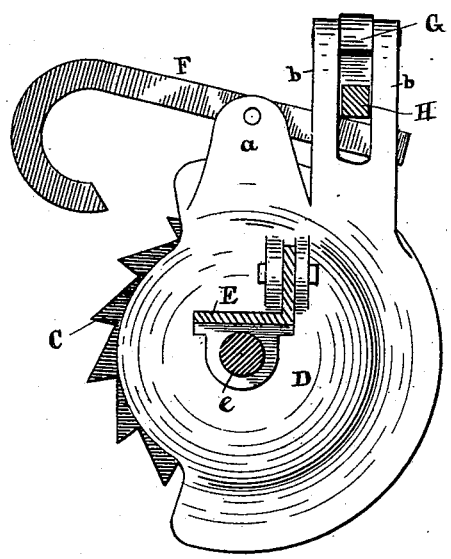
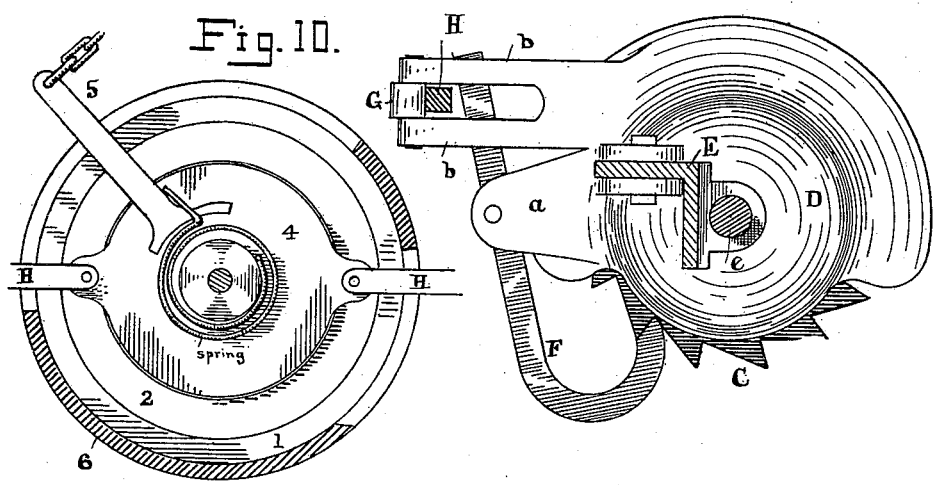
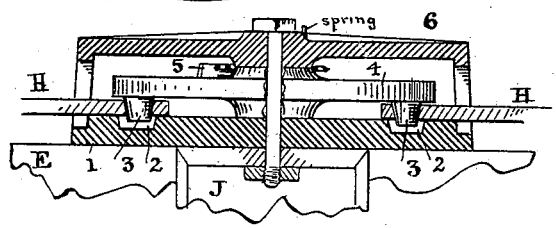
WITNESSES
J. N. Busch
C. Johnson
INVENTOR
Henry Green
By L. M. Thurlow
ATTY.

UNITED STATES PATENT OFFICE.

HENRY GREEN, OF PEKIN, ILLINOIS, ASSIGNOR TO THE ACME HARVESTER COMPANY, OF SAME PLACE.

HAY-RAKE.

SPECIFICATION forming part of Letters Patent No. 646,493, dated April 3, 1900.

Application filed December 19, 1898. Serial No. 699,639. (No model.)

*To all whom it may concern:*

Be it known that I, HENRY GREEN, a citizen of the United States, residing at Pekin, in the county of Tazewell and State of Illinois, have invented certain new and useful Improvements in Hay-Rakes; and I do hereby declare that the following is a full, clear, and exact description of the invention, which will enable others skilled in the art to which it appertains to make and use the same.

My invention relates to improvements in end-dump hay-rakes.

The object of my invention is to construct a hay-rake of this class free from all objections common to the rakes of this class and provide a rake capable of doing the hardest and heaviest work possible without the least chance of the disarrangement of any of its parts.

Heretofore all end-dump rakes have been constructed with a tripping arrangement for dumping the hay consisting of a bar or rod extending from one end of the rake to the other and actuated by some means or other in the hands of the operator, the dumping action, as well as the future utility of the rake, being dependent on the torsional or twisting strength of such rods. Two shorter bars have also been used in place of the single one and have been manipulated in much the same manner as the single one. These constructions are so commonly known that very little need be said of them other than to set forth their disadvantages in order that the device which I employ may be appreciated. These bars or rods are subjected to an immense torsional strain, and more especially when only one end of the rake has the entire load of hay to carry. When the bar of the full length is employed, it is held at its middle, while the ends engage the ratchet-teeth upon the carrying-wheels. It is obvious that when the pawls on the extremities of the rods which engage the ratchets receive the weight of the rake-head and the weight of the hay the strength of the rod is taxed to its utmost. When the load has been lifted and delivered, the bars regain their normal condition, providing the material of which they are made is of a fine grade. In the majority of instances, however, the rod or rods on receiving an overabundance of weight are permanently twisted, thereby rendering the rake useless, or at least until another rod has been substituted for the disabled one. In the event that the rods regain their proper form after their work the action of delivery has been retarded because of the inevitable twisting described. The substitution of the two shorter rods for the single one was done with the hope of overcoming these objections; but the result was even worse than before, for the reason that the shorter rods are not as likely to recover from the torsional twist as easily as a longer one no matter how excellent the material may be, and a permanent twist is the result. To set aside all dependence upon rods employed in this manner is the desire and aim of my invention. As it is impossible to produce a rod that will not twist when so used, at least without being cumbersome, other means must be employed.

My ideas may be readily understood from the drawings herewith, in which—

Figure 1 a plan view of a hay-rake, showing my improvement. Fig. 1ª is a detail of the manner of securing the shaft to the rake-head. Fig. 2 is a plan view of means for operating the pawls engaging the ratchets on the carrying-wheels. Fig. 3 is a perspective view of the same. Fig. 4 is a detail of a portion thereof. Fig. 5 is a sectional end elevation of the rake. Fig. 6 is a view of part of the same portion shown in tipped position. Fig. 7 is a perspective view of a pawl and its operating mechanism. Fig. 8 is a side view thereof, showing the ratchet-wheel. Fig. 9 is the same in its tipped position. Fig. 10 is a top view of a modified form of the operating means. Fig. 11 is a sectional elevation thereof.

In the figures, A is the rake-frame, B the carrying-wheels, and C C are ratchet-wheels secured to the latter. Beneath the rake-head E, at each end, is secured a stub-shaft e, projecting centrally through the shield D, affixed to the said rake-head. This construction is old, however, and I lay no claim to it except in combination with my improvements. As shown in Figs. 1 and 7, a pawl F is pivoted to the shield D by lugs a a, while behind these are lugs b b, pivotally supporting a hanger or link G. The end of a rod H is pivoted to the free end of the link, both the said link and rod being at right angles to the pawl. It will be seen that the pawl projects rearwardly between the lugs $b\ b$, so as to present its rear end to the said rod H. The heaviest end of the pawl lies forward of its pivotal point and when such pawl is left free to move will fall by its own weight into engagement with the ratchet-wheel. It will be noted that I show two of the rods H and at the middle of the rake provide a device for operating them. Such device is designed to move both rods simultaneously in the direction of their lengths. This consists of a table I, mounted on a bracket J, secured to the rake-head. At the middle of the table so supported is a rack-bar K, Fig. 2, sliding in guides L and L'. Said bar lies parallel with the rake-teeth. Upon the table, at each side of the rack-bar, is a pinion M, meshing with the teeth on the said bar K and rotated by it. To each pinion is attached the free end of one of the rods H in such manner that when the said rods are thrown to their outer limits, or away from each other, by the movement of the rack-bar the ends attached to the hangers or links are raised to permit the pawls to descend of their own will. The rack-bar is intended to have movement longitudinally, whereby the pinions are made to swing in opposite directions on their pivots, as described, to carry the rods H to the positions indicated by broken lines in Figs. 1 and 2. The rack-bar is made in two sections— an upper and a lower, $d$ and $f$, respectively— and between them is left a slot $g$ for the stationary guide or cross-head L', carrying a lug $h$. The sections are grooved and permit a coil-spring $i$ to lie between them, one end thereof being held by the said lug $h$ and the other by a lug $j$ in the bar. The tendency of the spring is to open and increase in length, thereby keeping the rack in the position shown in Fig. 2. In this position the rods H are drawn toward each other, as shown by unbroken lines, and keep the pawls free of the ratchets. A suitable casing I' covers the table, and bolts $I^2$, which hold the parts together, also serve as pivots for the pinions.

A foot-lever N is mounted on the frame A ahead of the rider's seat, and a chain attached thereto is connected to the rack-bar, as shown. A locking foot-lever O is likewise pivoted on the frame and connects loosely with a link P on the rake-head, while a stop Q is erected just above the joint between the lever and link to limit the upward movement of those parts. A hand-lever O' is placed upon the same pivotal point with the foot-lever and is used in assisting the dumping operation. While this latter lever mechanism is not new in this application, I describe it here to show its connection with the operation of the rake, although its use is not absolutely necessary.

The rake-frame is hung from the rake-head by brackets R, pivoted to the shafts $e$, as shown in Figs. 5 and 6, and so hung that the said frame retains a fixed position regardless of the movements of the rake-head. This is not a vital point, but the machine operates smoothly when so constructed. Upon the reach $k$ is a "knock-off" stop S, which takes the stroke or impact of the rack-bar as that member rises with the rake-head.

A modified form of the operating mechanism is shown in Figs. 10 and 11, in which the numeral 1 indicates a circular platform or table secured to the rake-head E. In the bottom is an annular groove 2, within which move two depending lugs 3 on a swinging plate 4. The rods H are provided with holes, through which the said lugs pass, it being understood that said rods lie upon the table and slide thereon, so that no other support is necessary. An arm 5 forms part of the plate 4 and swings that member upon its central support by means of the foot-lever and its chain. A casing 6 rests upon the plate or table 1 and is slotted in its side to permit the said rods H and rod 5 free movement. A spring surrounds the drum of the plate and engages the arm or rod 5, the other end being held in the casing, as shown in Fig. 11. The office of the spring is to return the plate and arm to their normal positions after being swung by the foot-lever.

The various operations are as follows: The normal positions when the rake is gathering hay are as shown in Figs. 1, 2, and 8—that is, the rods H are drawn toward each other in order to depress the rear ends of the pawls and raise their forward ends from the ratchets. While in this position the operator's foot is kept upon the lever O. By this means the pivotal connection between the lever and link P is kept up against the stop Q. It will be seen that the thrust of the rake with its weight of hay will be in the direction of a line drawn through the several pivotal points of the lever arrangement, Fig. 5. When the rake has gathered a sufficient quantity of hay, the foot is removed from the lever O and the hand-lever O' is moved rearwardly, at the same time applying pressure of the foot to the lever N. This latter action draws the rack-bar forward, swings the pinions on their pivots in a direction to move the rods H away from each other, and raises their outer ends by means of the outward thrust upon the links. The pawls are thus permitted to fall by gravity into engagement with the ratchet-wheels while the rake is in motion, and by reason of their being pivoted to the shell D the rake-head attached thereto is raised to the dumping position shown in Fig. 6. When fully raised, the point of the rack-bar strikes the knock-off or anvil S and by that action pushes the said bar backward or rather upward, revolving the pinions to draw the rods H toward each other, and consequently down upon the pawls, removing the latter from the ratchet-wheels. The spring $i$ completes the movement by returning the parts to their first positions, it being understood that the spring is not intended to be sufficiently powerful to accomplish the disengagement of the pawls and ratchets, but merely to complete the movement set up by the contact of the rack-bar with said knock-off stop. When the pawls leave the ratchets, the rake falls, and after reaching its downward limit the foot is again replaced upon the lever O, thus locking the rake while it proceeds to gather more hay.

I wish it to be understood that it is not necessary to use the locking arrangement, but it is simply an aid to the operator. Therefore the dumping device which I have shown and described may be used on any form of rake made. I do not limit myself to any particular form of the pawl-operating mechanism nor the apparatus for operating the rods H from the center of the rake for lifting the pawls. I merely wish to provide means of one form or another for operating the pawls without being dependent upon the strength of a bar under torsional stress, as before stated. The spring $i$ in the bar K may be dispensed with, if desired, for the reason that the knock-off stop will complete the entire operation of disengaging the parts and returning them to their places. The rods H and pawls may be connected so that the pawls need not depend upon gravity for their operation, but may be moved in a positive manner both when the rods are separated or brought toward each other. In my device the pawls are operated by a straight pull or push, as the occasion demands, and a very light rod or bar is sufficient to accomplish the desired end. The central operating device may be replaced by a simple hand operating mechanism and with good results.

The machine may be constructed so that a reversed action of the central portion will impart to the pawls their required movements. The stop S need not necessarily be employed, as the rake-frame will answer every purpose.

I am not aware of the existence of any device that will accomplish the purposes I seek, nor, indeed, have I discovered an attempt to provide anything to attain such purpose. As already stated, I do not wish to confine myself to the use of a pawl or the endwise movement of a rod, as other means can be employed.

I claim—

1. In a hay-rake the usual carrying-wheels therefor, ratchet-wheels secured to such carrying-wheels, a pawl pivoted above each ratchet, a rod parallel to the pivot of the pawl and means whereby said rod is made to bear down upon the pawl when moved in the direction of its length substantially as and for the purposes set forth and described.

2. In a hay-rake of the character described, carrying-wheels therefor, a ratchet-wheel secured to each wheel, a pivotal pawl adapted to engage the ratchet, a rod or bar above the pawl arranged to descend upon the same, and a link, carrying said rod in its swinging movements substantially as set forth.

3. In a hay-rake of the character described, the rake-frame, the rake-head, shields secured on the said rake-head, a ratchet-wheel within each shield, a pawl pivotally attached to each shield for engaging the ratchet-wheel, a pivotal hanger at right angles to the pawl, a bar or rod also at right angles to the pawl, pivoted at one end to the hanger, and passing between said hanger and pawl, and means for moving the rod in the direction of its length to operate the pawl substantially as described.

4. In a hay-rake of the character described, a ratchet-wheel secured to the carrying-wheel, a pivotal pawl engaging the ratchet-wheel, a hanger pivotally supported above and at right angles to the pawl behind its point of support, a rod also at right angles to the pawl pivotally hung at one end from said hanger and means at its opposite end for moving it in the direction of its length for the purposes set forth and described.

5. In a hay-rake of the character described, the rake-frame, the rake-head having pivotal connection therewith, a shaft at each end of the rake-head, a carrying-wheel mounted on each shaft, a ratchet-wheel secured to each wheel, shields, or supports secured to the rake-head, pawls pivoted on the shields for engaging the ratchets, links or hangers pivoted on the shields at right angles to the pawls, rods also at right angles to the pawls, attached to the hanger, and means for imparting movement to said rods whereby the ends thereof connected to the hanger are raised or depressed to release or raise the pawls for the purposes set forth.

6. In a hay-rake of the character described, the rake-frame, the rake-head having pivotal connection therewith, a shaft at each end of the rake-head, a carrying-wheel mounted on each shaft, a ratchet-wheel secured to each wheel, shields, or supports secured to the rake-head, pawls pivoted on the shields for engaging the ratchets, pivoted hangers on the shields at right angles to the pawls, rods also at right angles to the pawls attached to the hangers and passing between said hangers and pawls, means for imparting movement to said rods whereby the ends thereof connected to the said hangers are raised or depressed, consisting of a platform or support secured to the rake-head, a rack-bar thereon, a pinion at each side of such bar each having the free end of one of the rods, or bars attached thereto and means for giving the rack-bar longitudinal movement for the purposes set forth.

7. In a hay-rake of the character described, the rake-frame, the rake-head having pivotal connection therewith, a shaft at each end of the rake-head, a carrying-wheel mounted on each shaft, a ratchet-wheel secured to each wheel, shields or supports secured to the rake-head, pawls pivoted on the shields for engaging the ratchets, pivoted hangers on the shields at right angles to the pawls, rods attached to the hangers at right angles to the pawls and passing between said hangers and pawls, and means for imparting movement to said rods whereby the ends thereof connected to the said hangers are raised or depressed consisting of a platform, or support secured to the rake-head, a rack-bar thereon, a pinion at each side of such bar each having the free end of one of the rods attached thereto, a lever pivoted upon the rake-frame for operating the rack-bar, a chain connecting the bar and lever substantially as and for the purposes set forth and described.

8. In a hay-rake, of the character described, carrying-wheels therefor, a ratchet-wheel secured to each, pawls adapted to engage the ratchets by gravity and move therewith only during the delivery of hay, rods for raising the pawls from the ratchets, such rods having no connection therewith but arranged for vertical descent upon the rear extension of the pawls, links in the vicinity of the pawls for carrying the rods in their vertical movements and means for imparting movement to the rods in the direction of their length whereby they are lowered upon the pawls to raise the latter or raised to permit the pawls to descend upon the ratchets as set forth.

9. In a hay-rake having the usual carrying-wheels and ratchets, the rake-head having suitable shafts for each wheel, shields secured to the head in the region of the shafts, pawls pivoted on the shields at right angles to the rake-head, for engaging the ratchets, pivotal hangers behind the pivotal supports of the pawls, and rods also behind such pivotal supports and pivoted to the hangers; such rods adapted to descend upon the pawls by an endwise movement thereof substantially as and for the purposes described.

10. For a hay-rake, the rake-frame A, the rake-head E pivoted thereto, a stub-shaft $e$ secured at each end thereof, carrying-wheels B on the shafts, a ratchet-wheel C on each wheel B, shields D secured to the rake-head, pawls F pivoted near their middle to such shields, hangers G pivotally hung behind and above the pivots of the pawls, rods H loosely connected at one end to the hangers, a support I secured to the rake-frame, pinions M pivoted thereon and having the rods H attached thereto, a rack-bar K sliding between such pinions for moving them, a chain and lever for imparting longitudinal movement to such rack-bar and a stop S on the frame for engaging the rack-bar substantially as herein described and shown and for the purposes set forth.

11. In the hay-rake of the character described, employing pawls and ratchet-wheels for elevating the rake-teeth and delivering hay, rods located at right angles to the pawls and adapted to shift in the direction of their lengths, links adapted to support one end of each rod above the rearward extension of its respective pawl said rods adapted to swing on said links whereby said shifting movement will impart a vertical movement to the ends of the rods so hung to engage the pawls, for raising them from the ratchet-wheels, and also to permit them to fall by gravity into engagement with such ratchet substantially as set forth.

In testimony whereof I affix my signature in presence of two witnesses.

HENRY GREEN.

Witnesses:
H. C. STOVE,
W. H. BINNIAN.